J. H. NAUMANN.
TRANSMISSION GEARING.
APPLICATION FILED MAY 7, 1912.
1,061,554.
Patented May 13, 1913.
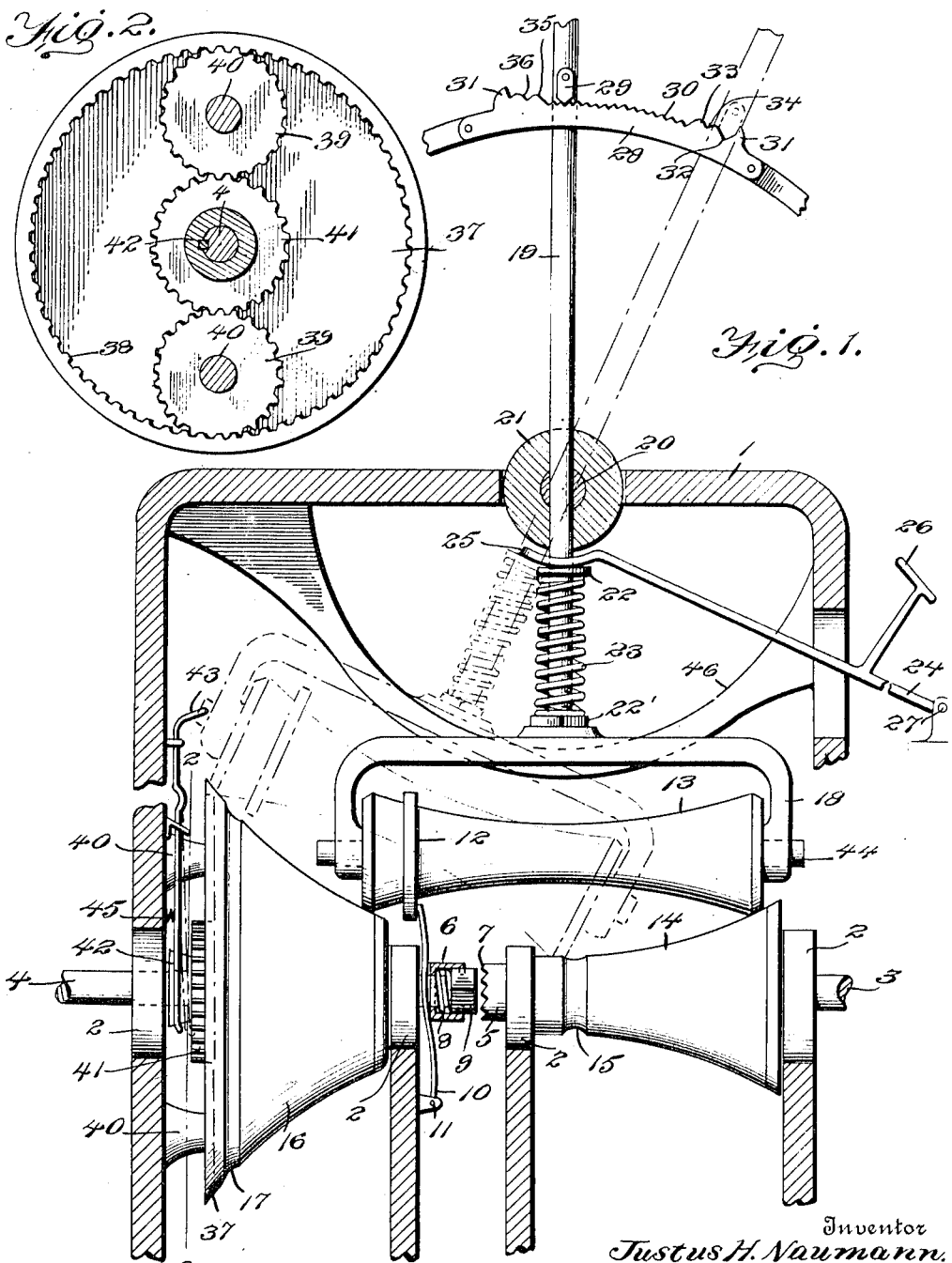
Witnesses
Inventor
Justus H. Naumann.
By _____, Attorneys.

UNITED STATES PATENT OFFICE.

JUSTUS H. NAUMANN, OF WOODLAKE, MINNESOTA, ASSIGNOR OF ONE-FOURTH TO J. PAUL SCHERF, OF BALATON, MINNESOTA.

TRANSMISSION-GEARING.

1,061,554.  Specification of Letters Patent.  Patented May 13, 1913.

Application filed May 7, 1912. Serial No. 695,791.

*To all whom it may concern:*

Be it known that I, JUSTUS H. NAUMANN, a citizen of the United States, residing at Woodlake, in the county of Yellow Medicine and State of Minnesota, have invented certain new and useful Improvements in Transmission-Gearings, of which the following is a specification.

This invention relates to transmission gearing, and one object of the invention is to provide a gearing especially adapted for automobiles where an easy, slow start of the vehicle is desired, capable of finally providing a direct drive between the motor and the traction wheels.

Another object of the invention is to provide a gearing which may be manipulated by means of a single lever, so as to produce the several different speeds desired, as well as to reverse the movement.

The invention also seeks, generally, to simplify the construction and arrangement of the parts of a transmission gearing to the end that the cost of production and maintenance may be reduced and the liability of the gearing to get out of order minimized.

All these stated objects, and such other objects as will incidentally appear as the description of the invention proceeds, are attained in a gearing of the type illustrated in the accompanying drawings, and the invention consists in certain novel features which will be hereinafter first fully described and then more particularly pointed out in the appended claims.

In the drawings:—Figure 1 is a sectional elevation of my improved gearing, showing, by full lines, the position of the parts immediately prior to the coupling of the driving shaft directly to the driven shaft, and, by dotted lines, showing the position of the parts to accomplish a reverse movement. Fig. 2 is a detail end elevation showing, more in detail, the reverse elements of the gearing.

The main frame, 1, may be of any usual or preferred construction, and at any convenient parts of the same, I provide bearings 2 in which the driving shaft 3 and the driven shaft 4 are journaled, the driving shaft 3 being connected directly with the motor, not shown, and the driven shaft 4 being connected with the axle carrying the traction wheels of the vehicle, as will be understood. The inner end of the driving shaft 3 is equipped with a clutch member 5 adapted to be engaged by a sleeve 6 on the driven shaft, constituting a co-acting clutch member, whereby the two shafts may be directly coupled, when so desired. The clutch members are provided with intermeshing teeth or notches, indicated at 7, so that when the sleeve 6 is projected to the clutch member 5, the two members will be directly engaged, so as to rotate together. The sleeve or clutch member 6 is normally held away from the clutch member 5 by a spring 8 housed within the sleeve and bearing against an internal flange or rim of the same and against an angular head 9 on the end of the driven shaft, as shown. The sleeve 6 of course, has an angular bore engaging the angular head 9, whereby the sleeve may slide axially of the shaft, while, at the same time, it will be compelled to rotate therewith. Consequently, when the sleeve engages the clutch member 5, the rotation of said clutch member will be imparted directly to the sleeve, and by it to the angular head 9, so that the shaft 4 will be caused to rotate with the driving shaft, and at the same speed.

To move the sleeve 6 into engagement with the clutch member 5, against the tension of the spring 8, a trip lever 10 is fulcrumed upon the frame, as indicated at 11, and has its free end arranged in the path of movement of an annular flange or shoulder 12 on the transmission roller 13, the intermediate portion of this trip lever bearing against the sleeve, as clearly shown in the drawing.

Fixed upon the driving shaft 3 is a tapered or conical roller 14 having its smaller end disposed adjacent the clutch member 5 and provided with an annular groove 15 immediately adjacent the said smaller end. A larger conical or tapered roller 16 is fixed upon the driven shaft 4, so as to rotate therewith, and the smaller end of this roller 16 faces the smaller end of the roller 14, an annular groove 17 being formed in the surface of the said roller 16 at the larger end thereof. The transmission roller 13 is of such form and dimensions that it will bridge the rollers 14 and 16, and its ends are normally in contact with the said rollers, whereby the rotation of the roller 14 will be transmitted through the roller 13 to the larger roller 16, the roller 14 thus constituting a driving roller, while the roller 16 is a driven roller to which movement is transmitted through the roller 13. The said transmission roller 13 is mounted in a yoke or similar frame 18 rigid with the lower end of an operating or controlling lever 19, said lever being fitted diametrically in a pivot 20 mounted in the frame and reinforced by a disk 21. Below the disk 21, a washer 22 is fitted upon the lever, and a spring 23 is coiled around the lever between this washer and the yoke 18, whereby the tension of the spring serves to normally hold the transmission roller toward the driving and driven rollers and in contact therewith. The driving and driven rollers have their surfaces so shaped as to follow arcs described about the pivot 20 as a center, so that the movement of the transmission roller, when the operating lever is manipulated, will be smooth and easy and will not destroy the contact between the rollers, but will preserve the frictional engagement between the same.

The foot lever 24 is utilized to form a fixed stop for the washer 22 and thereby effect the desired operation of the spring 23, and to this end, the said lever is provided at its free end with a stirrup 25 fitting around the lever 19 above the washer and curved to conform to the periphery of the disk 21, whereby the movement of the lever, under the influence of the spring, will be limited. The foot lever is provided with the usual foot-rest 26 and may be pivotally secured, as indicated at 27, at any convenient point of the frame. At a suitable point above the pivot, a locking bar or rack 28 is mounted upon the frame, and the lever is equipped with a dog or locking plate 29 adapted to ride over and engage notches, indicated at 30, in the edge of the locking bar, whereby to hold the lever in any position to which it may be adjusted, and consequently maintain the speed for which the gearing has been set. The notches 30 are preferably rather shallow to permit the dog 29 to ride easily over the same when the lever is being shifted, while, at the same time, they are deep enough to prevent accidental movement of the lever after it has been set. The rack bar is provided at its opposite ends with projections or stops 31 to limit the movement of the lever and prevent the same being shifted to a position where the gearing will be rendered inoperative, and adjacent the rear stop 31 is a deep notch 32 which may be engaged by the dog 29 to hold the lever in the position in which the motion of the driven shaft will be reversed. Immediately adjacent the said deep notch 32, a projection 33 is provided on the locking bar, and when the dog 29 engages the notch 34 in said projection, the transmission roller will be held in what may be termed the neutral position, with its ends immediately over the grooves 15 and 17, so that the driven shaft will not be coupled to the driving shaft and will consequently remain at rest. At the opposite end of the locking bar is a projection 35 having a notch 36, and when the dog 29 engages said notch 36, the transmission roller will be held away from the driving and driven rollers, but the sleeve or clutch member 6 will be in engagement with the clutch member 5, and the driven shaft coupled directly to the driving shaft.

Mounted loosely upon the driven shaft, immediately adjacent the larger end of the driven roller 16, is a disk 37 having its edge beveled or flared to form a continuation of the arc described by the surface of the said driven roller, and this disk is constructed with an overhanging rim provided with internal gear teeth 38, as shown in Fig. 2. Pinions 39 are mounted on stub shafts 40 projecting from the frame to mesh with the internal teeth 38 and also with a pinion 41 carried loosely by a hub 42 which is mounted upon the driven shaft, so as to rotate therewith and slide thereon. A trip lever 43 is suitably fulcrumed upon the frame and has one end engaging the said hub 42 and its other end projected into the path of the frame 18 or the axle 44 therein which carries the transmission roller. Ordinarily, the trip lever 43 is held by a spring, 45, in such position that the hub 42 will be drawn from the disk 37, and consequently the rotation of the said hub with the driven shaft will have no effect upon the pinions 41 and 39. If, however, the transmission roller be shifted to the extreme position shown in dotted lines in Fig. 1, the ends of the roller will then engage the edge of the disk 37 and the smaller circumference of the driving roller 14 respectively, and consequently motion will be imparted to the disk 37 from the driving roller through the transmission roller. It will also be noted that in this position of the transmission roller, the axle thereof or the yoke 18 will impinge against the free end of the trip lever 43, so that the said lever will be moved upon its fulcrum, and the hub 42 consequently moved axially upon the driven shaft 4, so as to bind within the pinion 41, and consequently the rotation of the disk 37 will be transmitted through the pinions 39 to the pinion 41, and thence to the hub 42 and through the same to the driven shaft which will now rotate in a direction contrary to its movement under the influence of the driven roller 16.

It is, of course, desirable, if not absolutely essential, that the axis of the transmission roller remain in the same plane as the axes of the driving and driven rollers. To attain this result, I provide one or more guide brackets 46 on the main frame adjacent the yoke 18 and curved so that in no position of the transmission roller will said roller impinge against the guide. The guide or bracket being disposed immediately adjacent the yoke, any tendency of the yoke to twist will throw the end of the same against the guide, and consequently the twisting tendency will be resisted and overcome.

It will be readily seen from the foregoing description, taken in connection with the accompanying drawings, that I have provided a mechanism in which all the different speeds required will be obtained by the manipulation of a single lever, so that the employment of a number of different levers and clutches, with their resultant interference, is overcome.

The speed attained by the use of the friction rollers may, of course, be varied by varying the diameters or sizes of the rollers, and to permit a smooth shifting from the friction drive to the direct drive, I prefer to have the larger end of the driving roller equal in diameter to the smaller end of the driven roller, so that when the parts are in the position shown in full lines in Fig. 1, the two shafts will be moving at about the same speed, and consequently no jar will be felt when the shafts are coupled directly. It will also be noted that the shifting from the friction drive to the direct drive is accomplished by swinging the lever to one limit of its movement, and the reversing of the vehicle is accomplished by swinging the lever to the opposite limit of its movement.

The operating lever is slidably mounted in its pivotal support, and the disk inclosing said support serves to reinforce the same against splitting, and also serves as a stop to limit the upward movement of the foot lever, and thereby prevent binding of said lever upon the main lever, and also prevent the washer upon the said main lever being shifted along the same to such extent that the spring bearing thereon will lose its effectiveness to hold the transmission roller in engagement with the driving and driven rollers. Should the rollers tend to slip, as when the machine is traveling up a steep grade or through sand or mud, the foot lever 24 may be pressed downward so as to compress the spring 23 and increase the force exerted thereby so that the tendency to slip will be overcome and the power of the engine effectually transmitted to the driven shaft. The spring may be initially adjusted to any desired tension by means of a nut 22' mounted on the lever and bearing against the lower end of the spring.

What I claim is:—

1. In a transmission gearing, the combination of a driving shaft, a driven shaft in axial alinement therewith, rollers on said shafts, a transmission roller frictionally engaging the rollers on the said shafts, means for shifting said transmission roller, and means whereby the movement of said transmission roller will couple the driven shaft directly to the driving shaft.

2. In a transmission gearing, the combination of a driving shaft having a clutch member at one end, a driven shaft in axial alinement with the driving shaft, a clutch member on the driven shaft adapted to engage the first mentioned clutch member, means for yieldably holding the clutch members out of engagement, rollers on the said shafts, a transmission roller adapted to frictionally engage said rollers, and a trip actuated by the transmission roller to shift the clutch members into engagement.

3. In a transmission gearing, the combination of a driving shaft having a clutch member at one end, a driven shaft in axial alinement with the driving shaft, a clutch member on the driven shaft adapted to engage the first-mentioned clutch member, means for yieldably holding the clutch members out of engagement, a trip lever mounted to bear upon the clutch member on the driven shaft, rollers on the said shafts, a transmission roller adapted to frictionally engage said rollers, and an annular projection on said transmission roller adapted to engage the said trip lever whereby when the transmission roller is swung beyond the rollers on the said shafts the clutch member on the driven shaft will be caused to engage the clutch member on the driving shaft.

4. In a transmission gearing, the combination of axially alined shafts, rollers upon the said shafts, a transmission roller adapted to frictionally engage the first-mentioned rollers, a disk loosely mounted on the driven shaft adjacent the roller thereon, a train of gearing disposed between the said disk and the driven shaft, a hub rotatable with said shaft and adapted to lock the same to one element of the train of gearing, and means adapted to be actuated by the transmission roller for shifting said hub.

5. In a transmission gearing, the combination of axially alined driving and driven shafts, rollers thereon, a transmission roller adapted to frictionally engage said rollers, a disk loosely mounted on the driven shaft and adapted to be engaged by the transmission roller, a normally inactive train of gearing connected with said disk, and means actuated by the shifting of the transmission roller to lock said gearing to the driven shaft whereby the motion of said shaft will be reversed.

6. In a transmission gearing, the combination of axially alined driving and driven shafts, tapered rollers on said shafts, the roller on the driving shaft having an annular groove near its smaller end and the roller on the driven shaft having an annular groove near its larger end, a transmission roller adapted to frictionally engage the tapered rollers, and means for locking the said transmission roller adjacent the said annular grooves whereby the driven roller may remain at rest.

7. In a transmission gearing, the combination of driving and driven shafts, tapered rollers thereon, a transmission roller frictionally engaging said rollers, a pivotally mounted frame carrying the said transmission roller, means for moving said frame to vary the point of engagement between the transmission roller and the tapered rollers, and yieldable means acting on said frame to hold the same against the tapered rollers.

8. In a transmission gearing, the combination of tapered driving and driven rollers, a transmission roller frictionally engaging the same, a yoke carrying said transmission roller, a pivotally and slidably mounted lever rising from said yoke and having a stop arranged around the support of said lever, a washer upon the lever limited in its movements by said stop, and a spring coiled around the lever between the yoke and said washer.

9. The combination of a driving roller, a driven roller, a transmission roller adapted to frictionally engage the same, a yoke carrying said transmission roller, a slidably and pivotally mounted lever rising from said yoke, a stop around the support of said lever, a foot lever fitting around the said slidably and pivotally mounted lever and having its end shaped to conform to the support of said slidable and pivoted lever, a washer on the said slidable lever bearing against the end of the foot lever, and a spring coiled around the slidable lever between the yoke and said washer.

10. The combination of a driving roller, a driven roller, a transmission roller adapted to frictionally engage the same, a lever carrying the said transmission roller, a dog on said lever, a locking bar adapted to be engaged by said dog, stops on said locking bar to limit the movement of the lever, and notched projections adjacent said stops adapted to be engaged by said dog.

11. The combination of a driving roller, a driven roller, a disk adjacent the driven roller, a transmission roller adapted to frictionally engage the said driving and driven rollers and said disk, an operating lever carrying said transmission roller, a locking bar, and a dog on the lever adapted to engage said bar whereby the transmission roller may be set to connect the driving roller with the driven roller or with the said disk.

12. In a transmission gearing, the combination of alined driving and driven shafts, rollers on said shafts, a transmission roller frictionally engaging said rollers, whereby the driven shaft will be caused to rotate in the same direction as the driving shaft at variable speeds, means for shifting the transmission roller in the axial plane of the driving and driven shafts, means whereby in one extreme position of the transmission roller the driven shaft will be actuated directly by the driving shaft at the same speed as said shaft, and means whereby in the opposite extreme position of the transmission roller the driven shaft will be rotated in a direction opposite to the direction of rotation of the driving shaft.

In testimony whereof I affix my signature in presence of two witnesses.

JUSTUS H. NAUMANN. [L. S.]

Witnesses:
  A. H. LOME,
  D. A. PODOLL.